(12) United States Patent
Ivazes (10) Patent No.: US 9,821,215 B2
(45) Date of Patent: Nov. 21, 2017

(54) SUSPENSION SYSTEM FOR A SKATEBOARD OR OTHER RIDER PLATFORM

(71) Applicant: Paul Ivazes, Grass Valley, CA (US)

(72) Inventor: Paul Ivazes, Grass Valley, CA (US)

( * ) Notice: Subject to any disclaimer, the term of this patent is extended or adjusted under 35 U.S.C. 154(b) by 0 days.

(21) Appl. No.: 15/378,813

(22) Filed: Dec. 14, 2016

(65) Prior Publication Data

US 2017/0087441 A1    Mar. 30, 2017

Related U.S. Application Data

(63) Continuation-in-part of application No. 14/322,441, filed on Jul. 2, 2014, now abandoned.

(60) Provisional application No. 61/886,794, filed on Oct. 4, 2013.

(51) Int. Cl.
```
A63C 17/02    (2006.01)
A63C 17/01    (2006.01)
A63C 17/00    (2006.01)
F16F 1/18     (2006.01)
F16F 1/26     (2006.01)
```

(52) U.S. Cl.
CPC ...... A63C 17/0046 (2013.01); A63C 17/0093 (2013.01); A63C 17/012 (2013.01); A63C 17/015 (2013.01); A63C 17/017 (2013.01); F16F 1/185 (2013.01); F16F 1/26 (2013.01)

(58) Field of Classification Search
CPC ....... A63C 17/00; A63C 17/01; A63C 17/011; A63C 17/012; A63C 17/02

USPC .............. 280/87.042, 87.041, 87.021, 87.03
See application file for complete search history.

(56) References Cited

U.S. PATENT DOCUMENTS

| | | | | |
|---|---|---|---|---|
| 3,774,924 A * | 11/1973 | Machatsch | ............. | A63C 17/02 280/11.208 |
| 4,109,925 A * | 8/1978 | Williams | ............. | A63C 17/012 280/11.28 |
| 4,152,001 A * | 5/1979 | Christianson | .......... | A63C 17/01 280/11.28 |
| 4,184,693 A * | 1/1980 | Whitmarsh | .......... | A63C 17/012 280/11.28 |
| 4,245,848 A * | 1/1981 | Dudouyt | ................ | A63C 17/01 280/11.28 |
| 4,251,087 A * | 2/1981 | Hansen | ................... | A63C 17/01 280/11.28 |
| 5,474,314 A * | 12/1995 | Lehman | ............. | A63C 17/0046 280/11.27 |
| 6,318,739 B1 * | 11/2001 | Fehn, Jr. | ............. | A63C 17/0046 280/11.223 |
| 6,945,542 B2 * | 9/2005 | Stewart | ............. | A63C 17/0093 280/11.27 |
| 7,007,977 B1 * | 3/2006 | Gallagher | ............. | A63C 17/26 280/11.27 |
| 2008/0252026 A1 * | 10/2008 | Kang | ................. | A63C 17/0093 280/11.27 |
| 2013/0175774 A1 * | 7/2013 | Lininger, Jr. | ...... | A63C 17/0033 280/11.27 |

* cited by examiner

*Primary Examiner* — Frank B Vanaman
(74) *Attorney, Agent, or Firm* — Gottlieb, Rackman & Reisman, P.C.

(57) ABSTRACT

An undercarriage of a person powered wheeled vehicle and, more particularly, to a cantilevered spring for absorbing shock and vibration is disclosed.

13 Claims, 6 Drawing Sheets

SUSPENSION SYSTEM FOR A SKATEBOARD OR OTHER RIDER PLATFORM

The present application is a continuation-in-part of U.S. patent application Ser. No. 14/322,441, filed on Jul. 2, 2014 and now pending, which claims priority to U.S. Provisional Patent Application No. 61/886,794, filed on Oct. 4, 2013, both of which are incorporated by reference in their entireties.

FIELD OF THE INVENTION

The present invention is directed to a suspension system for a vehicle, particularly for a person-powered vehicle, and more particularly to a truck assembly for a skateboard or longboard.

BACKGROUND OF THE PRESENT INVENTION

Many devices which a person may ride upon have suspension systems that include springs and dampers. In some cases, such as for a skateboard, the suspension system is a part of an undercarriage assembly. In other cases, such as for a ski, the suspension system is built into the device or into a combination of devices (e.g., ski boot, wakeboard boot, snowboard boot). Some activities, such as skateboarding, snowboarding, skiing, wakeboarding, and the like may involve a rider taking high risks, resulting in appreciable impact to the riding device and, consequentially to the rider, when the suspension system of the riding device does not absorb all or an adequate amount impact.

Typically, an individual controls a riding device by shifting their weight and/or position to self-steer the riding device. In some activities, particularly when impact is not fully absorbed by the riding device, and the impact transmitted to the rider can cause at least momentary loss of control of the device or loss of balance, thereby potentially resulting in inability to steer the device or instability of the device. As a result, such a situation can lead to an injury of the rider.

For example, a skateboard, in particular, is prone to large shocks. It is common for a skateboard to be used in particularly adverse environments, such as jumps or flips at high speeds. Often, the impact on landing can be on the order of multiple G forces and, when the skateboard assembly does not absorb adequate quantities of forces, excessive force can be transmitted to the rider who can readily be injured. Further, the skateboard rider can often attempt multiple consecutive such techniques and if the impact from the first technique, such as a jump, is not absorbed, injuries can become even worse, since momentum of the rider is maintained in anticipation of a second technique. Therefore, it would be beneficial to create an undercarriage which improves shock absorbing.

In addition, the device itself may be damaged or have its useful life shortened if it does not absorb impact or stress adequately. Any of the board, the spring, the axle, the wheels, or other parts of the skate-board assembly may break either due to a particularly impactful event or a collection of events. If this were to happen, the rider can become seriously injured as well.

Thus, there is a need for a skateboard assembly that allows for absorption.

Another problem with known skateboards is durability. Because the undercarriage performs a less than ideal job at impact absorption, it is not uncommon for parts to break or crack. In particular, micro fractures readily develop and expand from impact to impact, leading to degraded board performance or even breakage.

In general, a skateboard typically includes an elongated platform that has a pair of truck assemblies mounted at opposite ends of its underside and opposed to one another, each with an axle and pair of wheels. Each truck assembly further incorporates a base plate secured to the platform and a pedestal. The assembly is used for propelling the skateboard somewhat along a path generally aligned with the skateboard's longitudinal axis. Each assembly further includes a pivot stem that projects radially outward from a mid-portion of the axle for seating in a recess formed in the base plate. A ring-shaped hanger also projects radially outward from a mid-portion of the axle, at a prescribed acute angle (e.g., 45 degrees) relative to the pivot stem, for engagement with a kingpin which projects downwardly from the base plate. In traditional truck assemblies, the kingpin is fixed in position. Upper and lower bushings secure the hanger around the kingpin.

Yet further assemblies include a pedestal which captures the nut that aligns and assembles the bushings and the primary tension bolt (the kingpin) through the skateboard truck and hanger assembly. The pedestal aids in assuring proper alignment, enabling easier removal and replacement of standard skateboard hardware, and preventing slippage of the mounting plate. The device also aids in absorbing shock and forces generated through the tension bolt sustained during a ride.

The assembly described briefly above is configured to enable a rider to steer the skateboard simply by shifting his/her weight distribution rightward or leftward on the skate-board platform. This weight shift causes the platform to tilt correspondingly relative to the axles of the two truck assemblies, which remain at all times level relative to the ground. The axles thereby are caused to pivot horizontally about the axes of their associated kingpins, which in turn causes the skateboard to steer rightward or leftward. Riders generally desire to steer the skateboard using very slight shifts in their weight distribution. Loose or slack bushings generally allow greater movement and steering of the ring-shaped hanger about the kingpin and thus are more responsive to slight weight shifts than are tight suspensions. However, loose or slack bushings can fail to prevent certain undesired ride characteristics.

One known skateboard suspension apparatus serves to deflect irregularities encountered by a skateboard's wheels and lower the center of gravity of the board while the board is in motion, thereby providing stability, but concurrently decreasing the turning radius. This device does not include a flexible spring.

Another known device includes a shock absorbing apparatus located between a base plate and a truck plate that is pivotally attached at one end of the assembly. When assembled onto a skateboard, the device absorbs shock through the suspension while concurrently allowing the rider to maintain steering control.

SUMMARY OF THE PRESENT INVENTION

In summary, the present invention is directed to a suspension system that can be used, for example, in conjunction with a skateboard as part of a skateboard truck assembly to absorb high impact of the skateboard. Among the innovative aspects of the present invention are a spring, preferably cantilevered, and an associated assembly, which together can absorb high impact yet not preclude a rider's ability to turn or pivot and that have an extended life. The spring of the present invention includes holes, positioned and shaped for both absorption of impacts and for retaining structural integrity. The holes can be drilled so as to limit or eliminate the possibility of cracks and micro fractures.

The present invention also meets other concurrent needs including durability, the ability to easily and readily replace worn devices in the suspension system, the ability to allow wheels to freewheel (low friction), and the ability for a rider to steer in multiple directions.

In an embodiment, the present invention relates generally to a suspension spring truck for a skateboard, or the like, which attaches to or is within a platform of the skateboard on which the rider rides. The suspension spring truck includes a generally C- or U-shaped, cantilevered suspension spring with built in damping and, through a pivot pin, carries a transverse axle-supporting member (known as a hanger) at its opposite end. The spring can be used at either or both of the axle assemblies of the skateboard. The shape of the device, together with the material(s) used, is an improvement over prior designs. Further, the device may be inserted at each end wheel assembly.

The suspension spring mechanism is designed to progressively increase resistance, as forces acting on the spring increase, by deforming elastically, and by reverting to its original shape upon release of the forces. Such deformation is limited so as to both absorb impact and be temporary. The elasticity is a consequence of a combination of the materials used and the shape and embedded gaps. Many known suspension springs do not revert completely after a plurality of events where force is applied and/or the springs catastrophically snap at a time when force is being applied, typically while the rider is moving at a high rate of speed and as the rider may be attempting or landing a jump. These spring failures can be the direct cause of significant injury. The characteristics of the present invention, including material used, dimensions, and hole placement, extend the life of the spring and help to improve the time to spring breakage.

There are a few problems in the skateboarding industry that led to the development of the present invention and design. First is the physical impact that long term riders experience throughout their skateboarding careers. The number of injuries that occur, as well as the type of injuries sustained are common amongst most riders. Typically the majority of injuries sustained occur either on the ankles, the knees, or the spine. This is largely due to the impact and force of energy generated and absorbed throughout the body. These injuries are caused both by impact and repeated use, both consequential to stresses not absorbed by the board and instead absorbed by the rider.

There are further differences from existing truck assemblies and benefits over those assemblies, which are detailed below.

In addition to resolving the aforementioned problems that traditional trucks have posed in the past, there are other benefits to the present invention that were driving factors in the development of the present spring design. Skateboarders are always striving to achieve maximum height whether it's jumping onto objects, over objects, clearing gaps, or just for the sake of jumping for a trick. This is another reason why this particular sport is so wearing on knees, ankles, and spines. The amount of energy any given rider normally uses to achieve maximum "pop" and/or distance is constantly stressing the rider's and the board's limits. The spring is intended to enhance and truly maximize the riders energy output and to enable greater "pop" and distance when jumping, assist in easier/smoother landings, as well as creating more ease of deflection when the wheels encounter irregularities in terrain. Consequently, the smoother the ride and landing, the less impact to the rider.

Steering is unaffected between our trucks and normal trucks. Riders can adjust their steering by tightening down the kingpin nut on the truck, the tighter the kingpin nut the harder it is to turn, the looser the kingpin nut the easier it is to turn. Contrary to causal riders and many urban riders, professional riders and other high intensity riders are largely concerned with impact absorption. Additionally, freewheeling is important for typical professional and high intensity riders where riders can improve speed by reducing friction with the road surface. In order to reduce friction, a rider may "lift" a portion of the skateboard's wheel assemblies off the ground and ride, for example, only on the left edge of the left most wheels. Such a maneuver may be used, for example, in turning. In order to gain improved performance, the wheels all need to be able to rotate unencumbered by other associated wheels.

DETAILED DESCRIPTION OF EMBODIMENTS THE PRESENT INVENTION

The present invention relates generally to a suspension spring 100 (also referred to as a truck) as a part of a support structure for a personal transport device. The spring can be used in conjunction with a variety of devices, including skateboards, longboards, skis, snowboards and the like to extend the life of the device and reduce rider injury. Hereinafter the prevent invention will be described with reference to an embodiment for use with skateboards and longboards. The suspension spring 100 of the present invention includes a generally C- or U-shaped, modified cantilevered body with built in damping that is attachable to a platform of a skateboard, is within the platform or device, or some combination and, through a pivot pin, carries a transverse axle-supporting member (known as a hanger) at its opposite end.

The shape of the device, together with the materials used, and other structural elements, is significant with respect to the present invention and is an improvement over prior designs.

Figure 1:
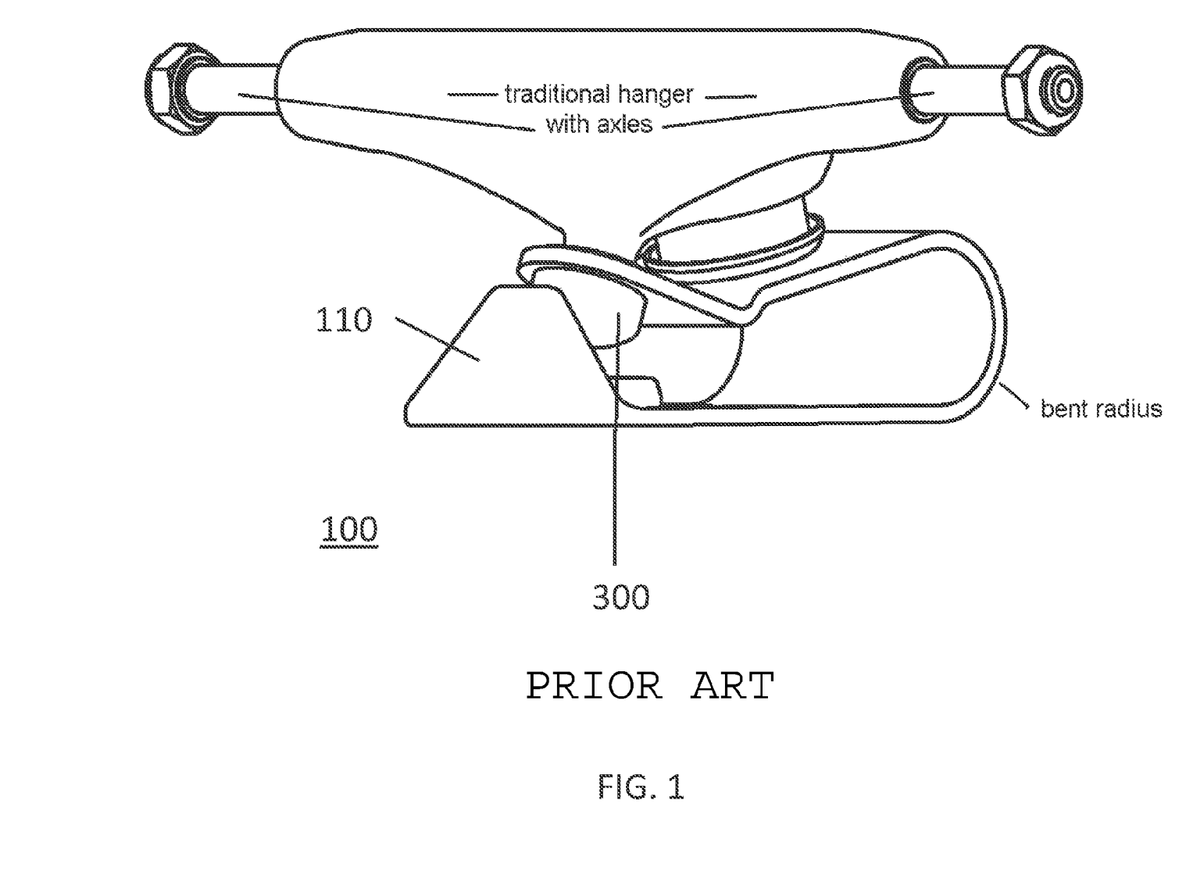
FIG. 1 depicts a front view of a skateboard truck with a traditional hanger, as would be in the prior art, with axles.

FIG. 1 depicts an example of the cantilevered spring 100 of the present invention, including depicting vertical portion 110, the bent radius, and attachment of a traditional hanger, where the hanger covers, at least in part, an axle. Pivot cup 300 is also shown.

Figure 2:
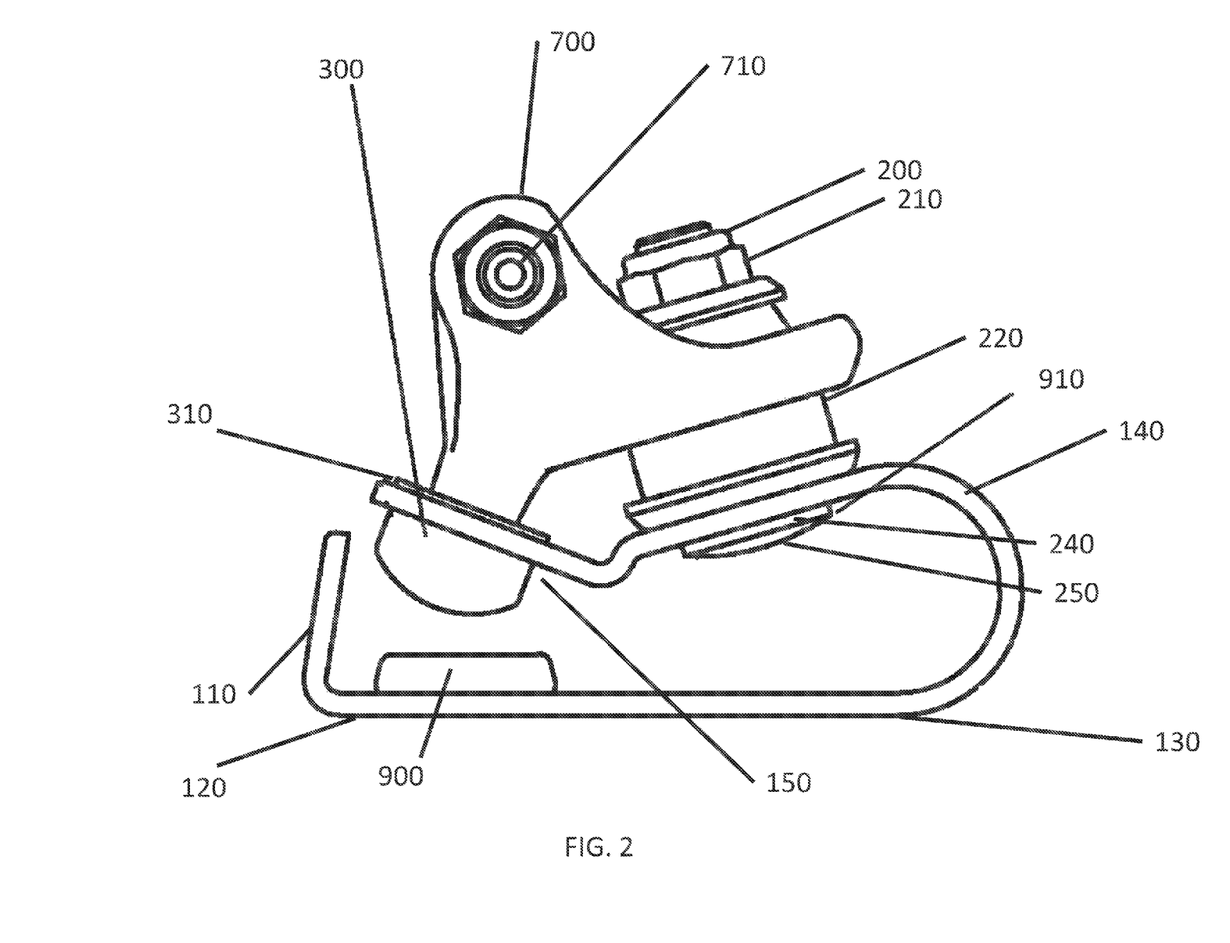
FIG. 2 depicts a side view of the cantilevered spring of the present invention as assembled, for attachment onto a skateboard.

FIG. 2 shows an embodiment of a side view of a cantilevered spring 100 of the present invention as assembled, for attachment onto a skateboard 500.

As shown in FIG. 2, spring 100 has five distinct portions: (1) a vertical portion 110; (2) a horizontal portion 120; (3) a curved portion 130; an angled portion 140; and a pivot portion 150. Vertical portion 110 extends from one end of the spring 100 and includes a plurality of holes aligned linearly. Vertical portion 110 is orientated at an angle that is approximately just less than 90 degrees from horizontal portion 120. Horizontal portion 120, which extends at one end from vertical portion 110, also has a plurality cutouts and a plurality of openings for attachment to a skateboard 500. Curved portion 130 extends from another end of horizontal portion 120. Angled portion 140 is a continuation of curved portion 130, is planar, and includes an opening for a kingpin. Pivot portion 150 extends at a bend from angled portion 140 and includes an opening to receive a pivot cup 300.

Figure 4:
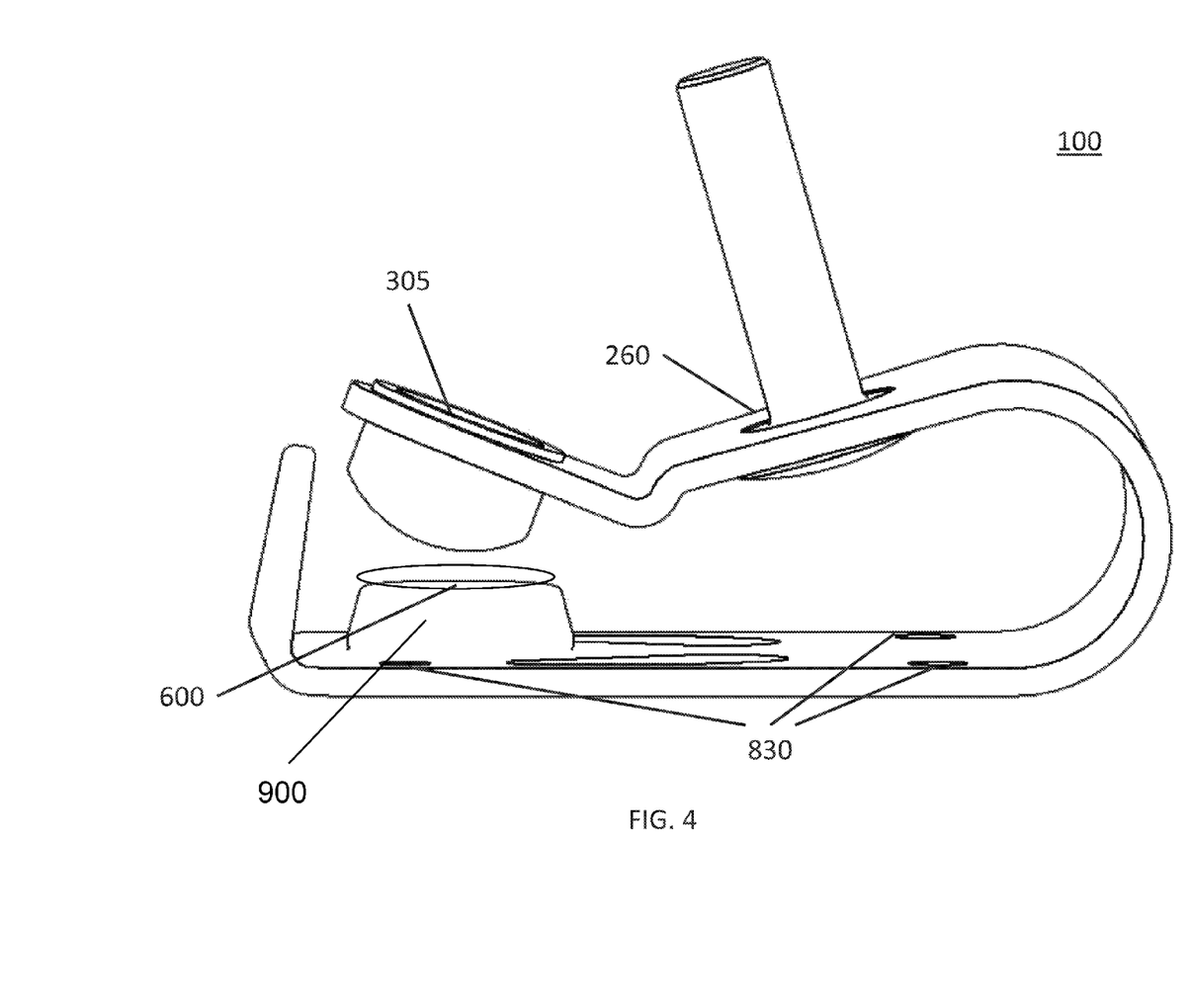
FIG. 4 shows a perspective view of the cantilevered spring of the present invention.

As can be seen in FIGS. 2 and 4, pivot cup 300 is attached at pivot portion 150 by welding the pivot cup 300 at the pivot portion 150, at forward hole 820, with pivot cup bushing 310 in place. However, the pivot cup 300 can be fixed within the opening by any other means that may be known or later becomes known. Also, an assembly is attached at the opening in angled portion 140 including kingpin 200, and top bushing 210 on one side of angled portion 140, and as assembly of bottom bushing 220, and captured nut 250, all placed in socket 240. Kingpin cover 910 is also optionally used to protect the kingpin. Also shown are hanger assembly 700 and axle 710.

The round spring radius formed by the curved portion 130 must be maintained in order to ensure that when the spring 100 is deformed, the pivot cup 300 does not contact the horizontal portion 120 (larger radius=very springy, medium radius=springy, small radius=stiff spring). The angle between the kingpin 200 and the pivot cup 300 is preferably 37.86° for proper steering, although variations of a few degrees may also meet the need, and variation of the angle may be set based on the rider's needs. To maintain a clearance of 0.5" a minimum angle of about 16 degrees is needed to keep the bend from interfering with the pivot cup placement (see FIG. 2). In the preferred method of manufacture, the angle is formed by applying a known bending process to a flat piece of metal.

In a preferred embodiment, the edges of the spring on the radius have been sanded/ground/machined down to a 0.060 inches radius to give a rounded edge which assist in the natural arching of the spring. The preferred range on this radius is 0.030 to 2 inches.

In addition, as is visible on FIG. 2, the present invention includes a front grind plate or vertical portion 110 for use by the rider for facilitating moves such as jumps.

Our device has 1 large chamfered hole where a polyurethane impact bushing snaps/pops into the base of the spring to prevent the metal impact cup from making contact with the wooden platform. Our device has an impact bushing 900, preferably polyurethane, that snaps/pops into place. The bushing aids in retaining longevity for the pivot cup and reduces stress on the spring.

Our device has a fixed metal pivot cup that passes through a hole on the topside of the spring that is welded into place at an angle.

Our device has a fixed flanged kingpin that passes through a hole on the underside of the spring that is welded into place at an angle.

Our spring has a series of sharp bends to achieve the desired angles and is made by bending on a jig that is bolted to a machine to the assigned locations on the flat spring.

Figure 3:
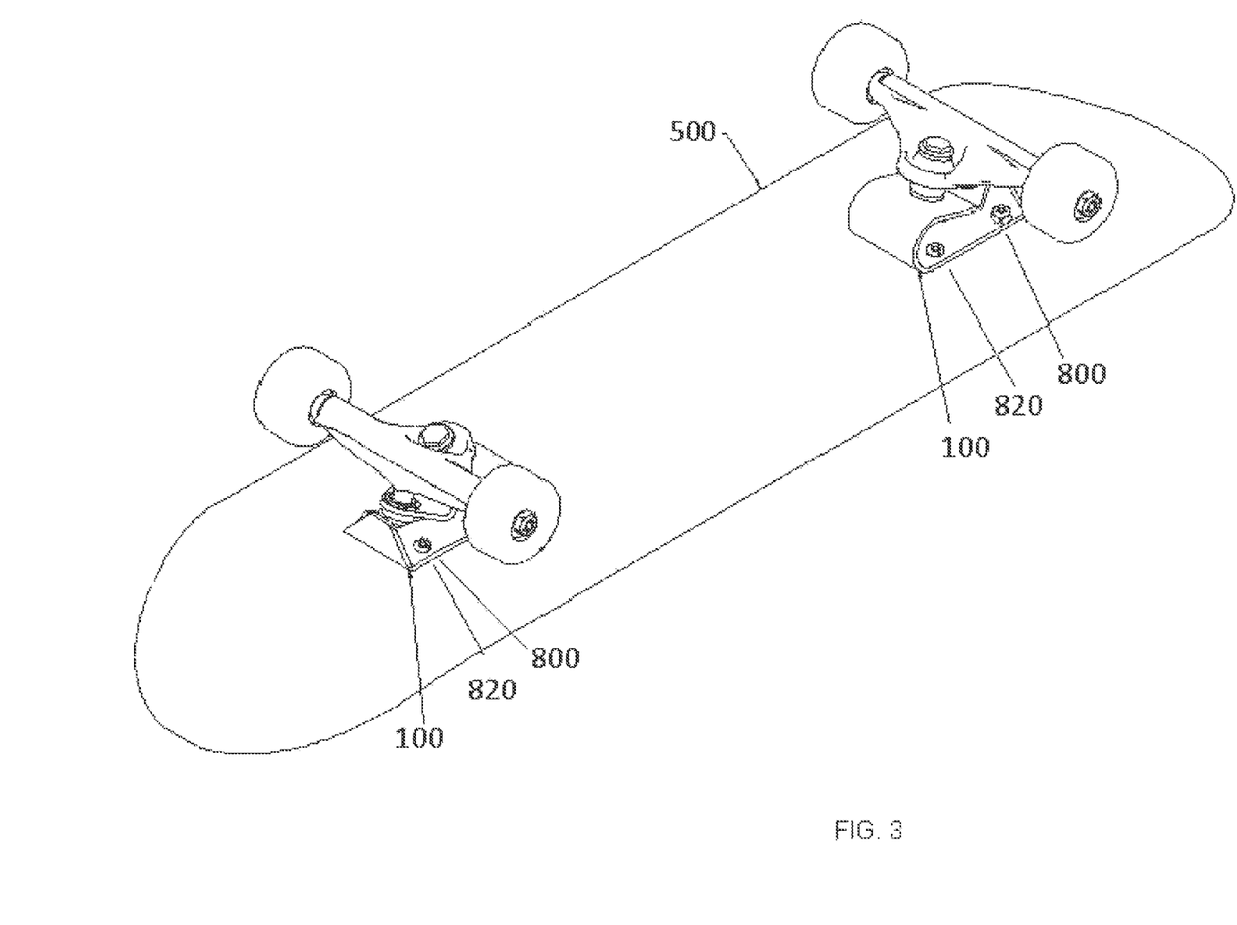
FIG. 3 is a perspective view of the bottom side of a skateboard with the cantilevered spring and other hardware attached thereto.

FIG. 3 depicts the bottom side of a skateboard 500 with two cantilevered springs 100 and associated wheels and axles attached. Particularly shown in FIG. 3 is the attachment arrangement, including nut 820 and screw 800.

FIG. 4 shows several openings in cantilevered spring 100. Kingpin hole 260 for receiving kingpin 200 and pivot hole 305 for receiving pivot cap 300 are shown in angled portion 140 and pivot portion 150 respectively. Also shown are screw holes 830 for receiving screws 800 for attaching spring 100 to skateboard 500. Horizontal portion 120 includes several holes which are sized and positioned for preferred damping in spring 100. In particular, center hole 600 (inside bushing 900) is sized for receiving pivot cup 300 when spring 100 is flexed for damping.

Figure 5:
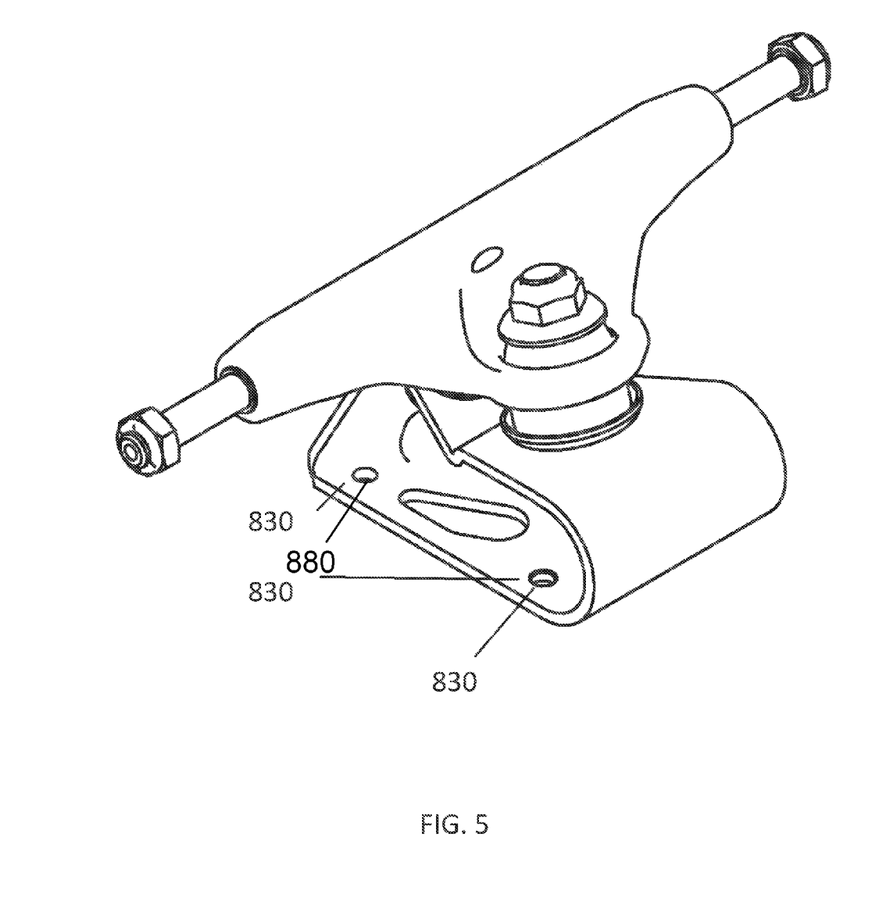
FIG. 5 shows a perspective view of the cantilevered spring of the present invention inclusive of hanger.

FIG. 5 provides a bottom side view of spring 100, including screw holes 830, center hole 600, and pivot hole 305. Of particular note in FIG. 5 is spring extension 880, where the metal of the present invention extends circumferentially around each screw hole 830. In this embodiment, the extended metal provides additional damping capability. As shown, center hole 600 is somewhat round shaped.

The rear mounting holes closest to the radius of the spring are chamfered.

Figure 6:
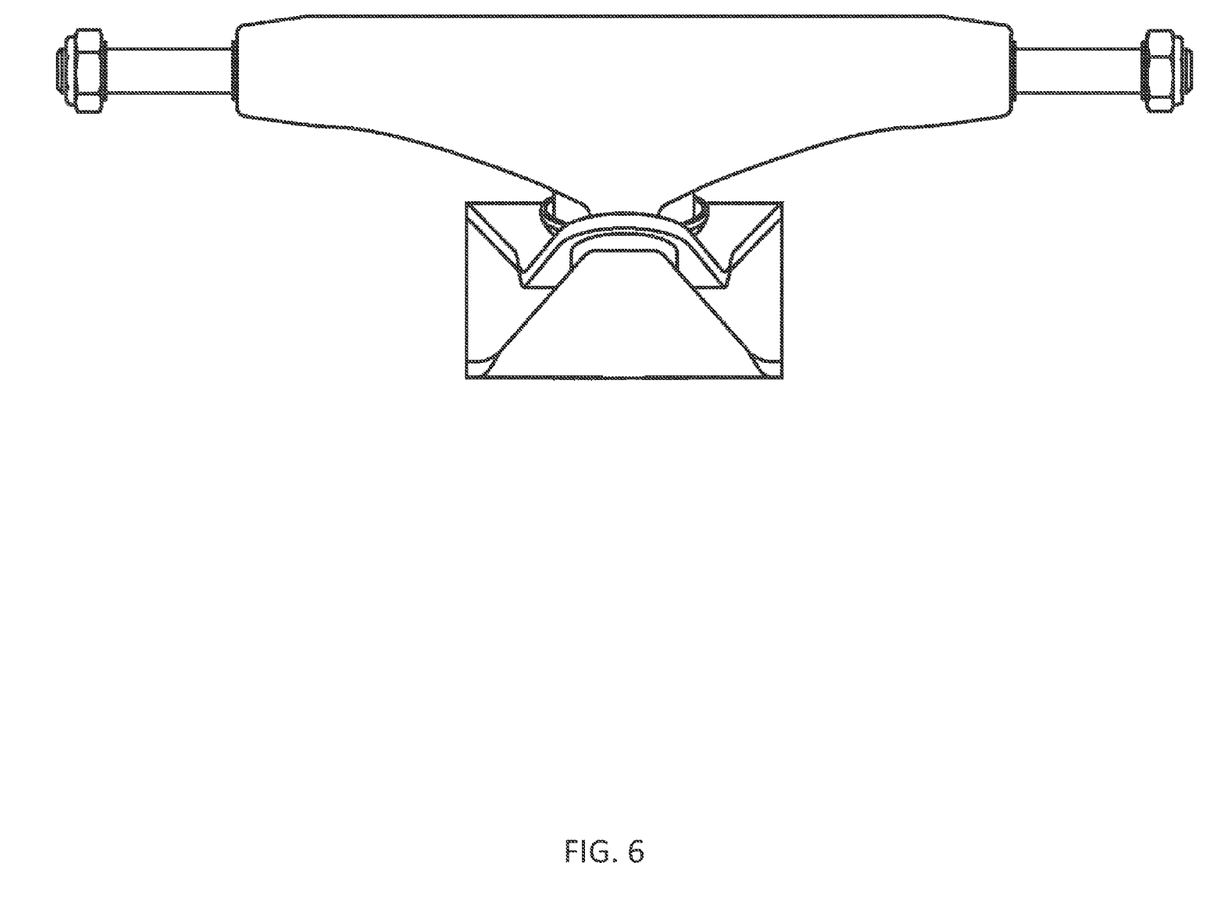
FIG. 6 shows a bottom-side view and the placement of holes in the cantilevered spring of the present invention.

FIG. 6 depicts a rear looking view of the spring of the present invention.

To start, in a preferred embodiment, each spring is comprised of metal nominally of up to 0.5 inches in thickness and 2 to 3 inches in width, which is bent to shape. The radius of the primary curve of the U shaped suspension spring design which generally impacts the compression of the spring can be varied by making a spring thicker or thinner from material thickness preferably ranging from 0.100 to 0.187 inches to change the amount of resistance, based, for example, on the skateboard rider's preference. In the preferred embodiment, the spring has an effective angle of 40 degrees, with a preferred range of 30 to 50 degrees. The suspension spring is designed with an alignment mechanism that functions to maintain and control the skateboard steering by way of tightening or loosening the bushings of the pivot pin for the axle carrying member. The suspension spring mechanism is intended to progressively increase suspension resistance as forces acting on the spring increase by deforming elastically in a plurality of directions, and subsequently reverting to its original shape upon release of forces. Because of the materials used and the shape of the cantilevered spring, together with hole placement, the spring of the present invention allows a rider to turn and to provide force, such as by jumping, without concern for spring or axle breakage or reduction in absorption. The characteristics of the present invention, including material used, dimensions, and hole placement, extend the life of the spring and preclude spring breakage.

The spring of the present invention is particularly conducive to accepting high compression forces. In laboratory environments of the present invention, continuous loads of up to more than 1200 lbs. of force compressing the spring 100 for extended periods of time have been applied with great success. Failure has been observed only after about 50,000 continuous hits in a row with 1200 lbs. of pressure.

The shock absorption of spring 100 and its associated assemblies enable the rider to ride longer without experiencing such fatigue. Essentially the spring 100 helps to alleviate the repercussions of the blunt force from landing, riding, and jumping sustained throughout a rider's ride and, by extension, career, allowing for not only a more comfortable ride, but ultimately a safer one.

Some of the shock absorption and steering control is accomplished through use of a device called a pedestal. The pedestal captures and holds in place the nut that aligns and assembles the bushings and the tension bolt, also referred to as the Kingpin. By removing the nut, alternate hardware can be inserted. The pedestal also attaches to the mounting plate so as to prevent slippage in the undercarriage. When assembled, the pedestal absorbs the shock of forces generated.

In one embodiment, the spring is formed of a rigid material such as but not limited to titanium and, when a force is applied, the force is transmitted to the axle. The spring prevents the axle from breaking by absorbing the force through its material and design. In part, the spring temporarily deforms when accepting the force, and due to the materials used and the curvature, together with the structural element placement—e.g., the kingpin—reverts to its original shape subsequent to the impact. Often, in prior designs, typically a break occurs while the rider is moving at a high rate of speed and as the rider may be attempting or landing a jump, such as due to impact on lift or landing. These axle failures can be the direct cause of significant injury.

The built-in damping is consequential to both the shape of the spring 100 and the location of holes, as well as to the material and dimensions of the spring 100. The modified cantilever suspension spring 100 may be formed of a hard metal, preferably high carbon steel (such as but not limited to 1074 spring steel), titanium or another metal or composite that can withstand such a load. In one embodiment, the spring 100 is machine stamped and rolled then heat treated and tempered to achieve the desired Rockwell hardness. Holes are then drilled in positions identified as best for shock absorption, energy distribution, and metal integrity. In the preferred embodiment, the holes are formed by stamping process, water, or laser puncture so as to limit the possibility of cracking or breaking at the hole locations.

Further benefits of the present invention include extended life of the bushings. Benefits in riding include the reduction in board wobble, which itself results in better control of the board during jumps and at other times. The lack of wobble allows a board and rider to stay closer together, with-out a vibration effect of the board on the rider.

In laboratory-based testing of the present invention with a variety of riders, riders who have served as third party testers clearly favor the present design over prior designs. Riders interviewed after use have said:

"it dampens vibration while maintaining directional control"

"parabolic angles of the kingpin change when applying downward force to spring when turning hard into bowl which assists in sharper turns when pumping in bowls"

"when popping out of a bowl on coping you do not notice the drag of the coping that slows you down because of the give from compression of the spring"

"when you do a kick flip the board lifts and stays with your feet instead of sagging downward"

"dropped 10 feet off a ledge and felt like going off a curb"

"manuals are better and can go on forever"

"locks onto coping better than other trucks because of the steel nose grind plate"

"pop out of bowls higher than ever like 3 feet higher"

"this is going to change skateboarding forever"

"boards do not seem to break as easy as they did before"

"when landing, the eyes can stay focused because of softer landings"

"6 to 16" higher when I Ollie"

"absorbs anywhere from 20% to 90% of the impact when landing (depends on height)"

"carve into bowls extremely fast 'like a !ambo' and can pump out like crazy which gives extra height off the top of the bowl"

"speed wobble is completely gone, no wobble at all when going 45 mph down a hill"

"you can land the hard tricks when it looks like you can't because of the give from the suspension "when landing, the skateboard does not slide as much out due to the spring"

"board retains pop like new even after a year of daily riding"

"skate shoes seem like they last forever instead of 2 to 3 months"

"you can skate longer and harder with less fatigue because of the suspension"

"took 5 minutes to get used to it"

"when landing 10 feet from a ledge it feels like 3 stairs"

"you do not get all the pain on your body from landing like you did before because of the suspension"

"can lock onto a curb/box/rail better because the nose on the front of the truck. There is more space to lock in with this design compared to the small aluminum block on normal trucks"

"the ride is quiet"

"bushings don't wear out"

"it rides smoother, feels like glass."

"no vibrations through the feet."

FIG. 5 shows another perspective view of the cantilevered spring 100 of the present invention and depicts a plurality of holes in the spring 100. The placement and size of the holes serve at least two purposes. First, by having an expanse of holes, material is eliminated. The elimination of material serves to reduce overall weight, so as to make handling of the assembled skateboard 500 easier and to also reduce applicable force. Second, the hole placement improves the ability of the spring 100 to absorb shock and impact, so as to allow the device to flex in ways otherwise not available. Still further, the placement of the holes, affords structural integrity to the spring 100. The holes as shown are in preferred sizes and locations. Other combinations of holes might alternatively be used as well. Center hole 600 is particularly significant in that it is positioned and sized so as not to preclude movement of the kingpin and associated array during spring deformation.

Further benefits of the present invention include improved performance for riders in many ways. Additionally, the board better remains in the control of the rider (non-control is referred to as slide out of a board) while riding and performing jumps. In addition, the ride has a softness, which is consequential to the spring 100, and makes learning to ride with the present suspension system easier than known suspension skateboard assemblies. Finally, because of the ease of accessibility of parts, it is simple and straightforward to replace undercarriage parts, such as bolts.

This spring 100 also serves a shock absorbing purpose, and assists in absorbing the force and energy generated from the impact of landing. That is, the spring smoothness of the ride, provides control, and absorbs shock. Traditionally skateboarding is excessively hard on a rider's body after a prolonged amount of time. With the shock absorbing element of the present invention, the riders are not subjected to blunt shock and stress to their knees, ankles, legs, and spine. In addition, the amount of energy as a whole that is transferred through a rider's body, just from the activities preformed while skateboarding on a daily basis wears riders out significantly.

FIG. 5 provides a top down view of spring 100 of the present invention. Of particular note are forward holes 830 in vertical portion 110. These holes are included for purpose of weight reduction of assembled skateboard 500 to which the spring 100 is attachable, as well as to provide for air flow through the spring. In the embodiment, there are seven holes but some other quantity and/or placement may alternatively be used. Among recognized benefits is the ability for further speed and flexibility so as to obtain higher jumps and better impact.

The present invention provides further improvement in a variety of ways. In particular, the present invention includes the aforementioned generally U-shaped suspension unit. In order to properly function, the undercarriage of the present invention includes additional elements, some of which alone or in combination with other elements serve to increase shock absorption over present designs.

Many of the differences and improvements from earlier designs are summarized below.

Whereas earlier designs are generally an S-shaped leaf spring with no grind plate, our device includes a stylized "C" shaped cantilevered spring with a built in grind plate at the front of the spring. No other truck manufacturer has a metal grind plate.

Whereas earlier designs use 5 wood screws as fasteners to secure the spring to the wooden platform, our device uses 4 $10/32$ nuts and bolts to secure the spring to the wooden platform.

Whereas earlier designs use rubber pads molded around a bolt and attached to the underside of an upper spring to as a snubber that can be engaged by the U-shaped portion of the spring upon deflection of the spring to prevent collapse of the spring to the point, our device has one large chamfered hole where a polyurethane impact bushing snaps/pops into the base of the spring to prevent the metal impact cup from making contact with the wooden platform.

Whereas earlier designs use a steel pin with upset ends that passes through two holes on the spring to secure it into place our device does not have and does not need pins with upset ends passing through the spring.

Whereas earlier designs include a bolt that extends through two thru holes on the spring with the legs being a part of the spring, our device has a flanged kingpin that passes through a hole on the underside of the spring that is welded into place at an angle.

Whereas earlier designs include a bearing against the upper ends of compression springs with cylindrical pins fit within the springs with their lower ends received in the sleeves of the pins, where the pins have integral frustoconical heads with their flat undersurfaces bearing against the upper ends of the compression springs, we do not have compression springs or anything of the kind built into or onto our spring.

Whereas earlier designs do not have a pivot pin, pivot cup bushing, or metal pivot cup associated with the spring device or complete assembly, our hanger which can be made from cast aluminum or magnesium, has a tapered pivot pin which is located preferably at the small mid section point of the hanger and fits into a polyurethane pivot cup bushing that fits into a metal pivot cup with rounded bottom with rounded bottom that is welded onto the spring.

Whereas earlier devices do not have polyurethane bushings that slide over a kingpin, sitting on top and bottom of hanger assembly that are preferably sandwiched between washers, our spring device has preferably two polyurethane bushings that slide over a welded flanged kingpin that sit on top and bottom of the hanger assembly and are sandwiched between two washers.

Unlike prior designs, the edges of the spring on the radius have been sanded/ground/machined down to a 0.060 inch radius to give a rounded edge which assist in the natural arching of the spring. This is one of our procedures we need to protect with our patent.

Whereas earlier designs do not have sharp angles bent into the spring from the means of a press or bending jig, our spring has a series of sharp bends to achieve the desired angles and is made by bending on a jig that is bolted to a machine to the assigned locations on the flat spring. This is one of our procedures we need to protect with our patent.

Whereas earlier designs do not call out that the mounting holes on the spring have chamfered holes, in our design the rear mounting holes closest to the radius of the spring are chamfered. This is one of our procedures we need to protect with our patent.

Whereas earlier designs do not have a fixed kingpin on the spring assembly; it is free floating/bolted into place and not permanent; our device has a fixed flanged kingpin that passes through a hole on the underside of the spring that is welded into place at an angle.

A further comparison, comparing pre-existing trucks to the trucks of the present invention, is shown below in Table 1.

TABLE 1

| COMPARISON CHART | | |
|---|---|---|
| | Standard Trucks | Present Invention ("Avenue") Suspension Trucks |
| PERFORMANCE | | |
| Impact | No impact absorption of any kind | Avenue's High Compression Spring Loaded Baseplate allows for optimal flexibility to enhance performance. A half inch of suspension travel absorbs energy from hard impacts and road vibrations. |
| Speed | Trucks do not increase speed in anyway. Road vibration slows down skateboarders. | Greater speed is achieved due to the baseplate's ½" of compression relative to the bottom of the spring. This travel absorbs vibration from rough concrete helping to maintain and increase speed overall |

TABLE 1-continued

COMPARISON CHART

|  | Standard Trucks | Present Invention ("Avenue") Suspension Trucks |
|---|---|---|
| Steering/Control | Turning and control is on a single tilt and turn X Axis pivot point. Turns feel jerkier as weight is more easily thrown side to side. | Control is smoother due to the allowance of more angles through an X & Y Axis through a 'floating pivot point'. Suspension allows for a smoother lean to turn ratio providing better control with immediate response. |
| Oversteer (Speed Wobble) | Direct contact pivot point provides no extra support and is at greater risk for over-steer and wobble | A floating pivot point helps reduce over-steer at faster speeds, improving control and stability. |
| Rider Stamina | Does not increase stamina | By absorbing energy from hard impacts and road vibrations Avenue Trucks reduce the amount of physical stress the body would usually endure during skateboarding. The end result-Riders see an increase in overall stamina. |
| TRICK ABILITY | | |
| Grinds | Trucks immediately begin to slow down during grinds. All grinding vibration is absorbed upwards into the skateboard and rider. | By helping to absorb vibration from rough edges, chipped concrete, or small dents in rails, the baseplate helps to maintain grind speed, reducing most elements that interfere with a long fast grind. |
| Flip Tricks | Uneven flips due to poor weight distribution of the axis-A heavier hanger (outer) and lighter baseplate (inner) With the weight distribution being greater towards the outer part of the skateboard, flips rotate unevenly and require greater effort to keep stable. | Flips are smoother due to better weight distribution of the axis-A heavier baseplate (inner) and lighter hanger (outer). With the weight distribution being greater towards the center of the skateboard, flips rotate with better ease and stability. |
| Pop | Design provides NO extra pop | The rigid suspension baseplate allows for compression before throwing tricks. Once the baseplate is 'popped' the pre-loaded compression is released and energy is expelled upwards into the deck, providing a better response and more pop to the rider. |
| Slides (Nose/Tail) | Baseplate is more susceptible to hang ups if it catches rough concrete | Has built in slide plate that helps prevent slide 'hang up' and allows for smoother slides |
| Air (Vert) | Standard amount of air is achieved by factors affecting speed. | Due to increased speed from compression of the baseplate through vert, skateboarders are generally able to achieve more height during airs |
| CONSTRUCTION | | |
| Hanger | Cast Aluminum Hanger | Lightweight Magnesium Alloy Hanger |
| Axle | Solid or Hollow Chromoly Axle | Hollow Chromoly Axle |
| Baseplate | Cast Aluminum Baseplate | High Compression Carbon Steel Spring Loaded Baseplate |
| Impact Bushing | Has no impact bushing | Design features a first ever 'Impact Bushing'. This further reduces impact through a soft bushing once the baseplate reaches full compression. |
| Kingpin | Pressed Kingpin | Welded Kingpin |
| Pivot Pin | Fixed pivot point | Floating Pivot Cup Steering System |
| Bushings | Multi density bushings | Multi density bushings |

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention.

The invention claimed is:

1. A truck for damping movement of a skateboard, comprising:
   a generally flat mounting plate portion comprising at least one chamfered hole for use in attaching a truck with a spring to an under surface of a board of a skateboard;
   a curved portion extending from a first end of said mounting plate portion at a first end of said curved portion and consisting of a single arc of a circle with radius from 0.25 to 1.5 inches;
   an angled sloping portion extending from its first end at a second end of said curved portion and sloping in the direction of the mounting plate, said angled sloping portion at an angle of 5 to 50 degrees relative to said mounting plate and with a cavity for receiving a kingpin assembly, said kingpin assembly including a flange welded to said spring;
   a pivot portion, including a tapered pivot pin, extending at an obtuse angle from a second end of said angled sloping portion and consisting of a cavity for receiving a pivot pin;
   a bushing attached to said flat mounting plate portion for preventing said spring from making contact with said board during use; and
   a single cantilevered grind plate at a second end of said mounting plate portion;
   wherein said spring is formed of a metal of at least 0.1 inches in thickness and 2 to 3 inches in width, said metal selected so as to absorb loads of at least 1200 pounds, said spring is arrangeable relative to said skateboard so as to allow at least a portion of said spring to elastically deform so as to absorb impact and to subsequently substantially revert to its original shape, and configurable to attach to one end of a dual axle skateboard so as to damp vibrations and absorb impact forces from use of said skateboard; and said kingpin assembly is attachable so as to be fixed in position in said spring yet floating relative to said mounting plate portion.

2. The spring of claim 1, wherein said metal is high carbon steel.

3. The spring of claim 1, wherein said metal is at least in part titanium.

4. The spring of claim 1, wherein said spring is connected to an axle only though use of a pivot pin.

5. The spring of claim 1, where said bushing is formed of polyurethane.

6. An undercarriage system for a skateboard comprising:
   a wheel assembly comprising a pivot pin, an axle, and at least one wheel;
   a kingpin assembly including a kingpin; and
   a spring comprising one cantilevered grind plate and a bushing for preventing said spring from making contact with a skateboard during use, said spring further comprising:
   a generally flat mounting plate portion comprising at least one chamfered hole for use in attaching to an under side of the board of a skateboard;
   a curved portion extending from a first end of said mounting plate portion at a first end of said curved portion and consisting of a single arc of a circle with radius from 0.25 to 1.5 inches;
   an angled sloping portion extending from its first end at a second end of said curved portion, sloping in the direction of the mounting plate, said angled sloping portion at an angle of 5 to 50 degrees relative to said mounting plate portion and said angled sloping portion including a welded-on flange attached at an end of said kingpin and welded to said spring, said angled sloping portion including a kingpin assembly receiving cavity; and
   a pivot portion extending at an obtuse angle from a second end of said angled sloping portion and consisting of a cavity receiving a tapered pivot cup pin;
   wherein said spring is formed of a metal of at least 0.1 inches in thickness and 2 to 3 inches in width, said metal is selected so as to absorb loads of at least 1200 pounds, and said spring is arranged relative to said skateboard so said spring will elastically deform to absorb impact and to subsequently substantially revert to its original shape;
   said kingpin is fit through said kingpin assembly receiving cavity of said angled sloping portion using spacers and said flange is fixed welded in place to said spring;
   said wheel assembly is mechanically coupled to said kingpin assembly; and
   said undercarriage assembly is configurable to attach to a dual axle skateboard.

7. The undercarriage system of claim 6, wherein said kingpin assembly is floating relative to said mounting plate portion.

8. The undercarriage system of claim 6, wherein said metal is high carbon steel.

9. The undercarriage system of claim 6, wherein said metal is at least in part titanium.

10. The undercarriage system of claim 6, wherein the spring of said system is connected to an axle though use of a pivot pin.

11. The undercarriage system of claim 6, where said bushing is formed of polyurethane.

12. The undercarriage system of claim 6, where said system is absent any compression springs beyond the core cantilevered spring.

13. A method for forming a cantilevered spring assembly for a skateboard comprising the steps of:
   forming a cantilevered metal spring shaped using a jig, said spring consisting of a series of sharp bends, said spring assembly comprising:
   a generally flat mounting plate portion comprising at least one chamfered hole for use in attaching said spring to an under surface of the board of a skateboard;
   a curved portion extending from a first end of said mounting plate portion at a first end of said curved portion and consisting of a single arc of a circle with radius from 0.25 to 1.5 inches;
   an angled sloping portion extending from its first end at a second end of said curved portion and sloping in the direction of the mounting plate, said angled sloping portion at an angle of 5 to 50 degrees relative to said mounting plate and with a cavity for receiving a metal kingpin assembly including a flange at one end of said kingpin; and a metal pivot portion, including a tapered pivot pin, extending at an obtuse angle from a second end of said angled sloping portion and consisting of a cavity for receiving said pivot pin, said pivot portion welded in place;

attaching a bushing to said flat mounting plate portion for preventing said spring from making contact with said board during use; and attaching a single cantilevered grind plate at a second end of said mounting plate portion;

wherein said metal is at least 0.1 inches in thickness and 2 to 3 inches in width, said metal selected so as to absorb loads of at least 1200 pounds, said spring is arrangeable relative to a skateboard so as to elastically deform to absorb impact and to subsequently substantially revert to its original shape, and configurable to attach to one end of a dual axle skateboard so as to damp vibrations and absorb impact forces from use of said skateboard; and said kingpin assembly is attachable so as to be fixed in position relative to said angled sloping portion and is floating relative to said mounting plate portion.

* * * * *